United States Patent [19]
Fukui

[11] Patent Number: 5,930,357
[45] Date of Patent: *Jul. 27, 1999

[54] METHOD OF MANAGING CONTRACTS FOR LICENSED PROGRAM USE AND A MANAGEMENT SYSTEM THEREOF

[75] Inventor: Toshiyuki Fukui, Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/297,179

[22] Filed: Aug. 29, 1994

[30] Foreign Application Priority Data

Aug. 30, 1993  [JP]  Japan .................................. 5-214521

[51] Int. Cl.⁶ .............................. G06F 17/60; H04L 9/00
[52] U.S. Cl. .................................... 380/4; 380/25; 705/1; 395/187.01
[58] Field of Search ............................... 364/401 R, 402; 395/700, 186, 778, 712, 207, 208, 187.01, 188.01; 380/4, 23, 25; 705/1, 7, 18, 26, 27

[56] References Cited

U.S. PATENT DOCUMENTS

| | | | |
|---|---|---|---|
| 4,454,594 | 6/1984 | Heffron et al. ........................ | 395/375 |
| 4,791,565 | 12/1988 | Dunham et al. ...................... | 395/186 |
| 4,796,220 | 1/1989 | Wolfe ..................................... | 380/4 |
| 4,864,494 | 9/1989 | Kobus, Jr. ............................. | 395/186 |
| 4,924,378 | 5/1990 | Hershey et al. ................... | 395/187.01 |
| 4,953,209 | 8/1990 | Ryder, Sr. et al. ..................... | 380/23 |
| 5,155,680 | 10/1992 | Wiedemer ............................. | 364/406 |
| 5,204,897 | 4/1993 | Wyman .................................. | 380/4 |
| 5,243,654 | 9/1993 | Hunter ................................... | 380/51 |
| 5,260,999 | 11/1993 | Wyman .................................. | 380/4 |
| 5,311,423 | 5/1994 | Clark ...................................... | 395/208 |
| 5,383,112 | 1/1995 | Clark ...................................... | 395/208 |
| 5,386,369 | 1/1995 | Christiano .......................... | 364/464.01 |
| 5,388,211 | 2/1995 | Hornbuckle ........................... | 395/700 |
| 5,390,297 | 2/1995 | Barber et al. ......................... | 395/700 |
| 5,579,222 | 11/1996 | Bains et al. ........................... | 395/712 |

*Primary Examiner*—Joseph Thomas
*Attorney, Agent, or Firm*—Fitzpatrick, Cella, Harper & Scinto

[57] ABSTRACT

The present invention has an object to provide a method of managing contracts for licensed program use with which a licensor is able to confirm whether or not a contract for using a program has been properly kept by the user, as well as provide a system capable of utilizing the managing method. At the user-side (20), information on the status of utilizing the licensed program is stored as data (25), and the stored data is outputted after it is coded. Whereas, at the licensor-side (10), the coded data is inputted and decoded, thereby the licensor is able to determine the status of utilization of the program.

6 Claims, 3 Drawing Sheets

METHOD OF MANAGING CONTRACTS FOR LICENSED PROGRAM USE AND A MANAGEMENT SYSTEM THEREOF

BACKGROUND OF THE INVENTION

The present invention relates to a method of managing contracts for licensed program use contracts and a management system, and more specifically relates to a method which manages contracts for licensed program use contracts utilized by computers, and to a system capable of utilizing the method.

In a contract for using a program, a user of the program (described as "a user" hereafter) is licensed to use the program by a licensor of the program (described as "a licensor" hereafter) perpetually, or for a limited period.

In a case where a user is licensed for a limited period, for example, conventionally, a utilization permission code which includes information such as an utilization term of validity and an ID number of a computer which is allowed to use the program is put in the program as a code. When the user uses the program, he inputs the utilization permission code which is compared with the one in the program. Thus managing the contract for using the licensed program is operated in this manner in order to avoid the program from being illegally used.

However, with the above mentioned method of managing contracts for licensed program use, conformance to the contracts depends only on the user, and the licensor can not grasp an accurate utilizing situation of the program without making the user uncomfortable.

As an example, if the licensor requests that the program be deleted from the computer because of the expiration of the contract period, the licensor can not confirm whether the user has actually deleted the program. Thus, the possibility of illegal use of the program, such as the user illegally keeping the program or illegally changing the expiration date of the contract in the copied program can not be eliminated. Furthermore illegal use of the program during the contract period can be unlimited.

SUMMARY OF THE INVENTION

The present invention has been made in consideration of the above situation, and has as its object to provide a method of managing contracts for licensed program use with which a licensor can confirm that a user is not illegally using the program according to a contract for using the program, and also to provide a system capable of utilizing the method.

More specifically, it provides a method of managing contracts for licensed program use with which a licensor can confirm the deletion of the program under the contract and know the program under utilization, as well as to provide a system capable of utilizing the method.

In order to overcome the aforementioned problems, according to an aspect of said method of managing licensed program use contracts of the present invention, an apparatus, which is capable of utilizing the method by using a program, stores utilizing situations of programs as data, and codes the stored data by execution of specific command. Thus a licensor can confirm that the user is in conformity with the contract with the licensor by analyzing the stored data which is decoded when read.

According to another aspect of the present invention, in a case where the period of the licensed program use contract is over, a specific command is executed and the program which has been used is deleted. At the same time, data which includes the execution date of the specific command, the ID number of the program, and the name of the apparatus where the program has been installed is coded. Accordingly, the licensor can confirm that the program on which the contract for utilization has expired is deleted by analyzing the decoded data.

According to further aspect of the present invention, a specific command is executed, and the data which includes the ID number of the program which has been used, the apparatus where the program has been installed, the execution date of the specific command, and the contents of a log file which relates to the utilization of the program is coded. Accordingly, a licensor can confirm that the user has conform to the contract with the licensor by analyzing the decoded data.

According to further aspect of the present invention, a management apparatus is capable of utilizing the method of managing licensed program use contracts by using a program, and comprises a storing means for storing information on status of using the program as data, a coding means for coding the stored data, and an output means for outputting the coded data.

According to further aspect of the present invention, the management apparatus further comprises an input means for inputting the coded data carrying information on the status of utilizing the program, a decoding means for decoding the coded data inputted by said input means, and another output means for outputting the decoded information on the status of utilizing the program.

According to further aspect of the present invention, a management apparatus is capable of utilizing the method of managing licensed program use contracts by using a program, and comprises a storing means for storing information on the status of using the program as data, a coding means for coding the stored data, and a decoding means for decoding the coded data under predetermined conditions.

According to further aspect of the present invention, a management system is capable of utilizing the method of managing licensed program use contracts by using a program, and comprises a storing means for storing information on the status of using the program as data, a coding means for coding the stored data, at least one device having an output means for outputting the coded data, an input means for inputting the coded data informing the status of using the program, and a decoding means for decoding the coded data inputted by said input means.

Other features and advantages of the present invention will be apparent from the following description taken in conjunction with the accompanying with drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

DETAILED DESCRIPTION OF THE PREFERRED EMBODIMENTS

Preferred embodiments of the present invention will be described in detail in accordance with the accompanying drawings.

An example of a structure of a system

Figure 1:
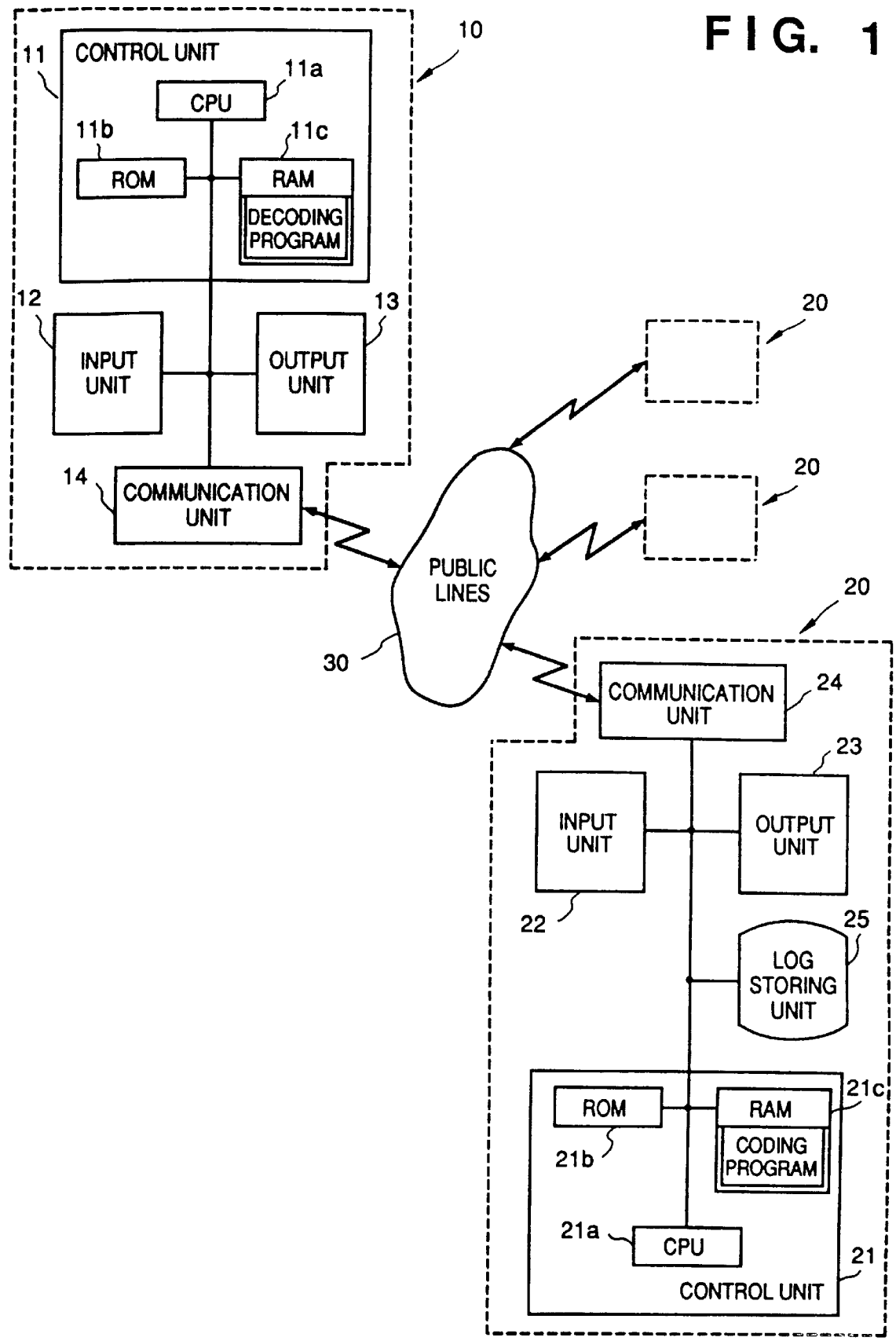
FIG. 1 is a block diagram showing an example of a structure of a system capable of utilizing the method of managing contracts for licensed program use.

FIG. 1 is a block diagram showing an example of a structure of a system capable of utilizing the method of managing contracts for licensed program use. In this system, a licensor-side device 10 and a user-side device 20 are connected with public lines 30.

The licensor-side device 10 comprises a control unit 11 which includes a CPU 11a for control and operation, a ROM 11b to store a program or the like, and a RAM 11c as an auxiliary memory or for storing an application program, an input unit 12 such as a keyboard, an output unit 13 such as CRT, a printer and a communicating unit 14 which controls the connection to the public lines 30 and to the user-side device 20. Note that the RAM 11c contains a decoding program for decoding the coded data transmitted from the user-side device 20.

The user-side device 20 comprises a control unit 21 which includes a CPU 21a for control and operation, a ROM 21b to store a program or the like, and a RAM 21c as an auxiliary memory or for storing an application program, an input unit 22 such as a keyboard, an output unit 23 such as a CRT, a printer, a communicating unit 24 which controls the connection to the public lines 30 and to the user-side device 20, and a log storing unit 25 which has a disk or the like to store logs including the status of using the program. Note that the RAM 21c contains a coding program for coding the data to be transmitted to the licensor-side device 10.

The decoding and coding program can be stored in the ROMs, and also the coding program can be transmitted from the licensor-side device 10 to the user-side device 20 at proper times.

The interchange of data between the licensor-side and the user-side can be done not only by an on-line electrical mail but also by mailing a record medium such as a floppy disk or an IC card, and by sending the outputted data on the recording paper via FAX. In these cases, the input unit 12 of the licensor-side device 10 additionally comprises a floppy drive, an IC card reader, or the like, and the output unit 23 of the user-side device 20 additionally comprises a floppy drive, an IC card writer, or the like.

An Example of a Managing Sequence of a Utilization Contract (First Embodiment)

Figure 2:
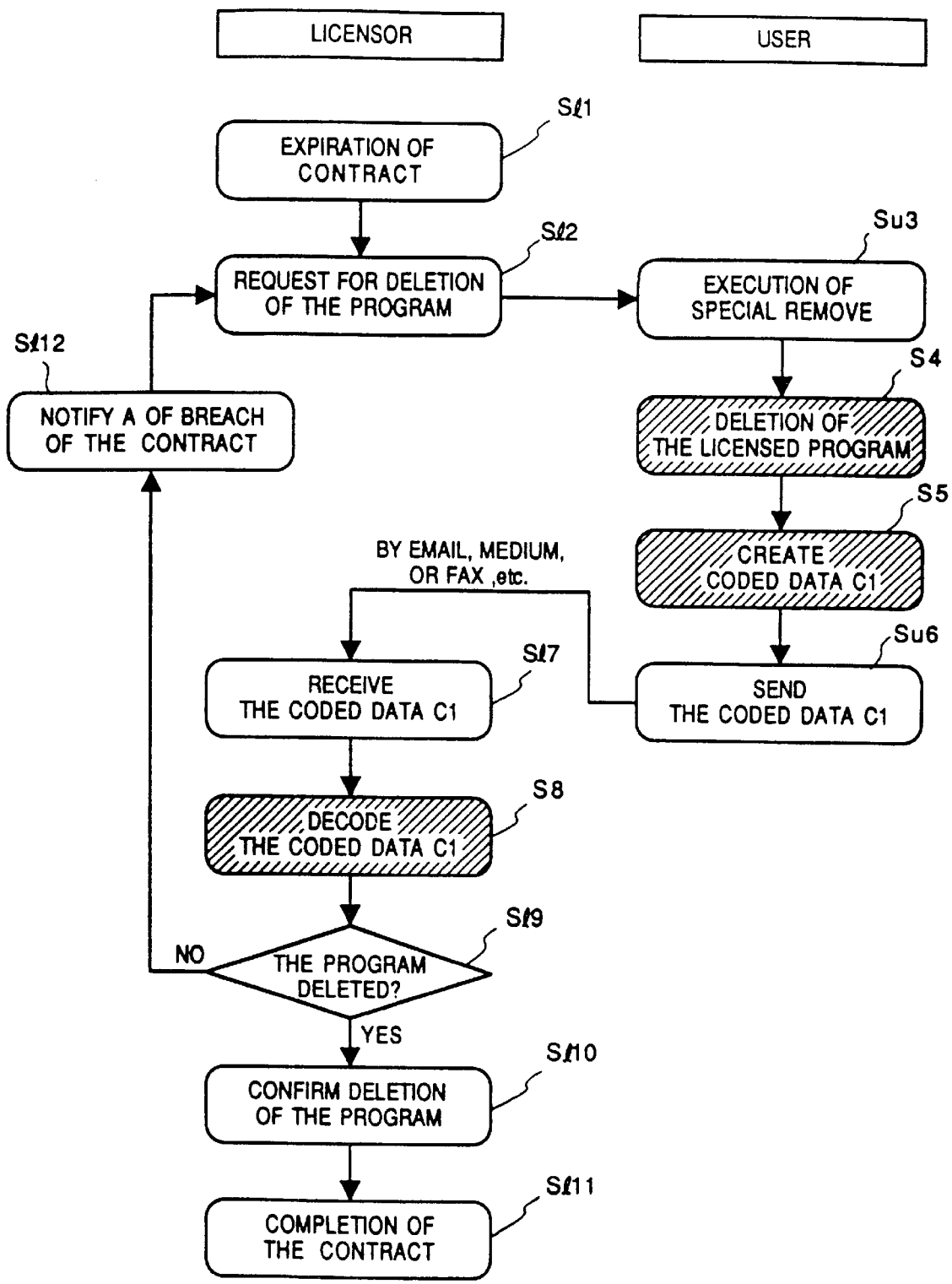
FIG. 2 is a flowchart showing a processing sequence in a first embodiment.

FIG. 2 is a flowchart showing a processing sequence in a first embodiment. In this figure, hatched boxes represent operations which are executed by a program under use or a licensor's program automatically running in the user's or licensor's apparatus. The outline of the process is described below.

First, the licensor requests the user to delete the program according to the expiration of the contract for using the program.

Second, the specific command (described as "Special Remove", in short, "Srm" hereafter) which is supplied by the licensor is executed on the licensed program at the user's side. The Srm deletes the licensed program, and codes the contents of a data file which contains necessary information such as the execution date of the Srm, the ID number of the program, and the name of the computer where the program has been installed, then generates a specific coded data C1. The user sends the code to the licensor by electronic mail, or sends the medium where the coded data C1 is recorded by mail or via FAX.

The licensor who received coded data C1 is able to confirm that the user conformed the contract and honestly deleted the program by decoding to read coded data C1.

The aforementioned process is explained below, by following steps.

At step S11, the licensor verifies that the contract period for program use is over. Next, licensor requests the user to delete the program at step S12.

When the user receives the deletion request of the program, executes the Srm at step Su3. According to the execution of the Srm, the program which is provided by the licensor and has been used is deleted at the step S4. At step S5, the content of the data file which contains the necessary information such as the execution date of the Srm, the ID number of the program, and the name of the computer where the program has been installed, is coded, then the specific coded data C1 is generated. At step Su6, the user sends the generated coded data C1 to the licensor by electronic mail, or mails the medium where the coded data C1 is recorded, or sends the information of the medium via FAX, and so on.

The licensor receives the coded data C1 at step S17, and decodes and reads the coded data C1 at step S8. Then at step S19, the result of the read C1 is inspected to determine whether or not Srm is executed properly, and if not, the process proceeds to step S112 to notify a breach of the contract, then goes back to step S12. If the execution of the Srm is determined proper at step S19, the process proceeds to step S110 and the deletion of the program is confirmed, then the contract comes to an end at step S111.

The execution of the Srm at the user's side can be caused by direct input of the command by the user, or by remote control of the command by the licensor through a line.

(Second Embodiment)

Figure 3:
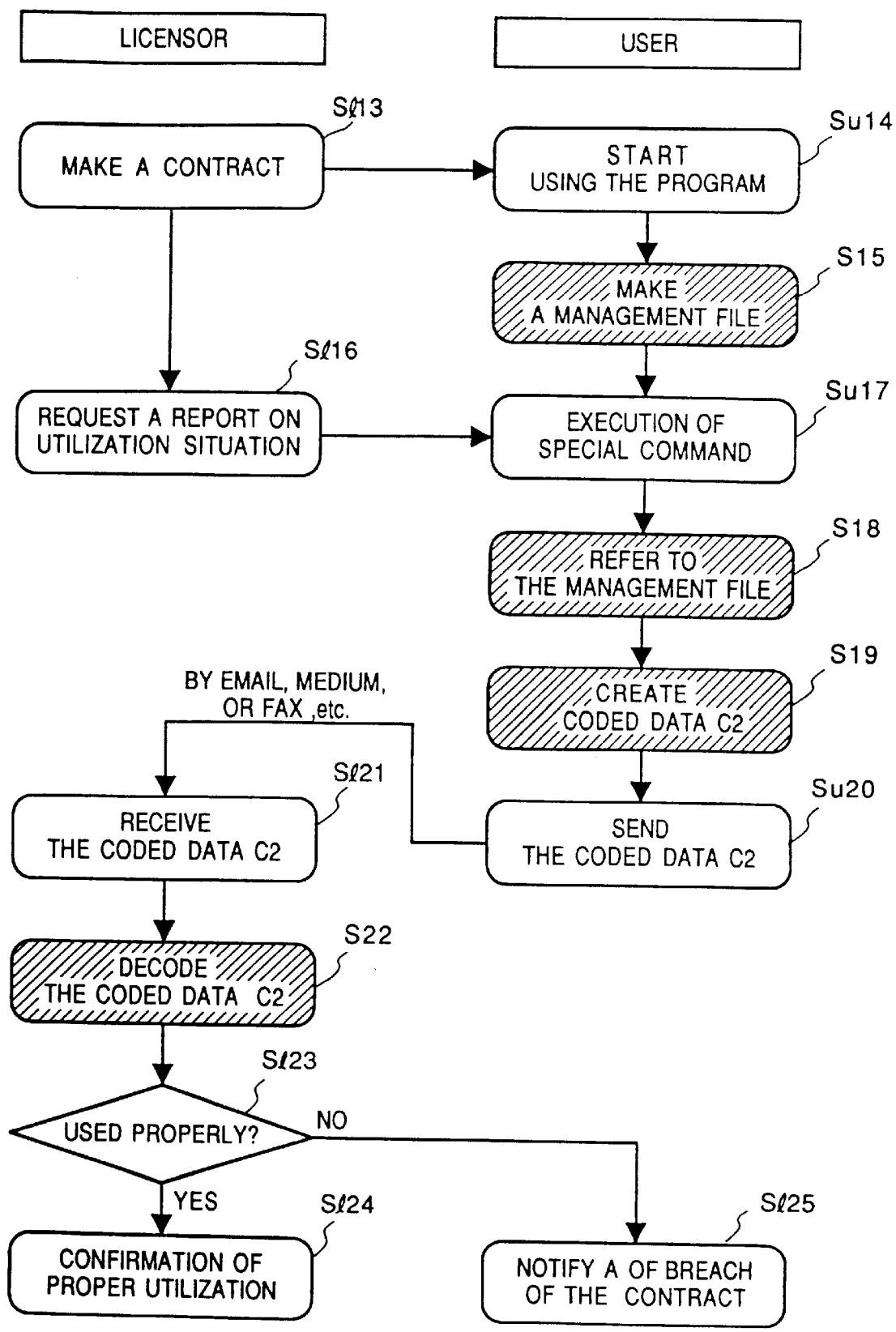
FIG. 3 is a flowchart showing a processing sequence in a second embodiment.

FIG. 3 is a flowchart showing a processing sequence in a second embodiment. In this figure, the operations whose boxed are distinguished with dots are automatically operated by a program under use or a licensor's program. The outline of the process is described below.

First, the licensor requests the user for information on the utilization of the program based on the contract for licensed program use.

The user executes the specific command (described as "Special Command", in short, "Scm" hereafter) in the program. The Scm is provided by the licensor. The Scm codes the content of a log file which relates to the utilization of the program, or the like (for instance, a data file which contains necessary information such as the ID number of the program and the name of the computer where the program is installed), then generates a specific coded data C2. The user sends C2 to the licensor.

The licensor who received the coded data C2 can confirm that the user has properly used the content of the program, for instance.

Note that the log file indicates the file where information such as how the program has been used (utilized hours, times, and users, etc.) and whether or not the user illegally tried to copy the program. For the sake of safety, the log file is preferred to be coded to prevent the user from changing it freely.

The process shown in FIG. 3 is described by following steps.

At step S113, the user contracts to use the program with the licensor. The user start using the program at step Su14. Step S15 is a process during using the program, and thereat the program makes a management file which includes the status of utilizing the program automatically.

At step S116, the licensor request the user to report the status of utilizing the program. When the user receives the request for the report, he executes the Scm at step Su17. Thereby, at step 18, the management file, that is a log file related to the use of the program, or a data file which contains the necessary data such as date, the ID number of the program, the name of the computer where the program is installed, is made. The management file is coded at step S19, then the specific coded data C2 is generated. At step Su20, the user sends the generated coded data C2 by the electronic mail, or mails a medium where the coded data C2 is recorded, or sends the content of the medium via Fax.

The licensor receives the coded data C2 at step S121, and successively decodes and reads the coded data C2 at step S122. Then, at step S123, the licensor examines whether or not the decoded data shows that the user has been keeping the contract properly, and if not, the licensor notifies the breach of the contract at step S125, then the proper process is operated. Whereas, if the decoded coded data C2 shows the proper use of the program by the user, the licensor can confirm this.

Note that in the second embodiment, the execution of the Scm can be caused by the direct input of the command by the user or by the remote operation by the licensor through a line as in the first embodiment.

According to the system's structure of the embodiments, the licensor-side device and the user-side device are connected with communication cables, however, the communication means is not limited to the communication cables, and the object of the invention can be satisfied by mailing or sending via FAX the medium where the coded data is recorded, as is mentioned in embodiments.

Further, the licensor-side device is considered separately from the user-side device in the embodiments, however, the same object of this invention can be satisfied by using the user-side device only, for example. In that case, the user-side device stores the coded data, and the licensor uses the user-side device to execute the specific program, then decodes and analyzes the coded data at a proper time.

Further, the programs which are executed by the Srm and the Scm can be in each licensed program or can be an independent program.

The present invention can be applied to a system constituted by a plurality of devices, or to an apparatus comprising a single device. Furthermore, the invention is applicable also to a case where the object of the invention is attained by supplying a program to a system or apparatus.

It is apparent from the aforementioned explanation that, according to the invention, the licensor can obtain information on the status of utilizing the program as a coded data, and know the status of utilizing the program by decoding the data and analyzing the coded information. Further, specifically, a licensor can confirm the deletion of the licensed program of which contract has expired, and also check licensed programs under utilization.

The present invention is not limited to the above embodiments and various changes and modifications can be made within the spirit and scope of the present invention. Therefore, to appraise the public of the scope of the present invention, the following claims are made.

What is claimed is:

1. A method of managing licensed program use contracts comprising the steps of:
   in a user side apparatus where a licensed program has been installed,
   deleting the licensed program when a contract of using the licensed program has expired;
   preparing and encrypting data notifying of completion of the deletion which includes a deletion execution date, an ID of the licensed program, and a name of the user side apparatus by executing a specific command when the deletion of the licensed program has completed; and
   transmitting the encrypted data notifying the completion of the deletion to a licensor side apparatus; and
   in the licensor side apparatus,
   deciphering the encrypted data transmitted from the user side apparatus; and
   confirming the deletion of the licensed program whose contract has been expired by analyzing the deciphered data.

2. The method according to claim 1, wherein execution of the specific command is instructed by a licensor by remote control.

3. A method of managing licensed program use contracts comprising the steps of:
   in a user side apparatus where a licensed program has been installed:
   encrypting a log file representing an execution history of a licensed program in a manner in which a user of the apparatus cannot decipher the encrypted log file and accumulating the encrypted log file;
   reading out the encrypted log file by executing a specific command; and
   transmitting the encrypted log file to a licensor side apparatus; and
   in the licensor side apparatus:
   deciphering the encrypted log file transmitted from the user side apparatus; and
   confirming the status of utilizing the licensed program by the user by analyzing the deciphered log file representing the execution history.

4. The method according to claim 3, wherein execution of the specific command is instructed by a licensor by remote control.

5. A system for managing licensed program use contracts including a user side apparatus where a licensed program has been installed and a licensor side apparatus,
   said user side apparatus comprising:
   deleting means for deleting the licensed program when a contract of using the licensed program has expired;
   preparing means for preparing and encrypting data notifying of completion of the depletion which includes a deletion execution data, an ID of the licensed program, and a name of the user side apparatus by executing a specific command when the deletion of the licensed program has completed; and
   transmission means for transmitting the encrypted data notifying the completion of the deletion to said licensor side apparatus; and
   said licensor side apparatus comprising:
   deciphering means for deciphering the encrypted data transmitted form said user side apparatus; and
   confirmation means for confirming the deletion of the licensed program whose contract has expired by analyzing the deciphered data.

6. A system for managing licensed program use contracts including a user side apparatus where a licensed program has been installed and a licensor side apparatus,
   said user side apparatus comprising:
   encryption means for encrypting a log file representing an execution history of a licensed program in a manner in which a user of the apparatus cannot decipher the encrypted log file and accumulating the encrypted log file;
   reading means for reading out the encrypted log file by executing a specific command; and
   transmission means for transmitting the encrypted log file to said licensor side apparatus, and
   said licensor side apparatus comprising:
   deciphering means for deciphering the encrypted log file transmitted from said use side apparatus; and
   confirmation means for confirming the status of utilizing the licensed program by the user by analyzing the deciphered log file representing the execution history.

* * * * *

UNITED STATES PATENT AND TRADEMARK OFFICE
CERTIFICATE OF CORRECTION

PATENT NO. : 5,930,357

DATED : July 27, 1999

INVENTOR(S) : TOSHIYUKI FUKUI

It is certified that error appears in the above-identified patent and that said Letters Patent is hereby corrected as shown below:

COLUMN 1

Line 24, "avoid" should read --prevent--.

COLUMN 2

Line 13, "form" should read --formed--; and
Line 47, "with drawings," should read --drawings,--.

COLUMN 3

Line 64, "conformed" should read --conformed to--.

COLUMN 4

Line 5, "program," should read --program, the user--;
Line 29, "boxed" should read --boxes-- and "dots" should read --cross-hatching--;
Line 55, "start" should read --starts--; and
Line 59, "request" should read --requests--.

UNITED STATES PATENT AND TRADEMARK OFFICE
CERTIFICATE OF CORRECTION

PATENT NO. : 5,930,357

DATED : July 27, 1999

INVENTOR(S) : TOSHIYUKI FUKUI

It is certified that error appears in the above-identified patent and that said Letters Patent is hereby corrected as shown below:

<u>COLUMN 5</u>

Line 45, "appraise" should read --apprise--;

Line 54, "notifying" should read --notifying a licensor apparatus--;

Line 58, "completed;" should read --been completed by execution of the specific command;--;
    Line 59, "notifying the completion" should be deleted;
    Line 60 should read --to notify the licensor side apparatus of the completion of the deletion; and--; and
    Line 66, "been" should be deleted.

<u>COLUMN 6</u> specific command--;
    Line 31, "notifying" should read --"to provide notification"-- and "depletion" should read --deletion--;
    Line 32, "a" should be deleted;

--in a manner in which a user of the apparatus cannot decipher the encrypted data--;
    Line 35, "completed;" should read --been completed by execution of the specific command;--;

UNITED STATES PATENT AND TRADEMARK OFFICE
CERTIFICATE OF CORRECTION

PATENT NO. : 5,930,357
DATED : July 27, 1999
INVENTOR(S) : TOSHIYUKI FUKUI It is certified that error appears in the above-identified patent and that said Letters Patent is hereby corrected as shown below:

Line 37, "notifying the completion of the deletion to" should read --to notify--; and
Line 38, "apparatus;" should read --apparatus of the completion of the deletion, and--.

Signed and Sealed this

Eighth Day of August, 2000

*Attest:*

Q. TODD DICKINSON

*Attesting Officer*    *Director of Patents and Trademarks*